United States Patent
Van Den Brink et al.

[11] Patent Number: 5,927,424
[45] Date of Patent: Jul. 27, 1999

[54] SELF-STABILIZING, DIRECTIONALLY CONTROLLABLE VEHICLE WITH AT LEAST THREE WHEELS

[75] Inventors: Christopher Ralph Van Den Brink; Anthonie Van Den Brink, both of Westmaas; Hendrik Marinus Kroonen, Zwijndrecht, all of Netherlands

[73] Assignee: Brinks Westmaas B.V., Westmaas, Netherlands

[21] Appl. No.: 08/750,789

[22] PCT Filed: Jun. 13, 1995

[86] PCT No.: PCT/NL95/00209

§ 371 Date: Dec. 10, 1996

§ 102(e) Date: Dec. 10, 1996

[87] PCT Pub. No.: WO95/34459

PCT Pub. Date: Dec. 21, 1995

[30] Foreign Application Priority Data

Jun. 14, 1994 [NL] Netherlands ............ PCT/NL94/00142
Aug. 11, 1994 [NL] Netherlands ............... 9401303
Apr. 18, 1995 [NL] Netherlands ............... 1000161

[51] Int. Cl.[6] .................................................. B62D 61/08
[52] U.S. Cl. ..................................... 180/216; 280/124.103
[58] Field of Search ..................... 180/210, 215, 180/216; 280/124.103, 124.1

[56] References Cited

U.S. PATENT DOCUMENTS

| | | | |
|---|---|---|---|
| 3,023,023 | 2/1962 | Wilson | 280/124.103 |
| 3,781,031 | 12/1973 | Patin | 180/210 |
| 4,064,957 | 12/1977 | Parham . | |
| 4,529,055 | 7/1985 | Gotoh et al. | 180/210 |
| 4,624,469 | 11/1986 | Bourne, Jr. | 180/210 |
| 4,678,053 | 7/1987 | Watanabe et al. | 180/210 |
| 5,116,069 | 5/1992 | Miller | 180/210 |

FOREIGN PATENT DOCUMENTS

| | | |
|---|---|---|
| 0 020 835 | 1/1981 | European Pat. Off. . |
| 0 153 521 | 9/1985 | European Pat. Off. . |
| 0 592 377 | 4/1994 | European Pat. Off. . |
| 1158922 | 6/1958 | France . |
| 2 338 836 | 8/1977 | France . |
| 2 120 184 | 11/1983 | United Kingdom . |
| 2 155 410 | 9/1985 | United Kingdom . |

*Primary Examiner*—Lanna Mai
*Assistant Examiner*—Avraham H. Lerner
*Attorney, Agent, or Firm*—Young & Thompson

[57] ABSTRACT

Self-balancing vehicle with at least three wheels resting on the ground, at least two of which wheels are arranged on either side of the center of gravity with respect to the longitudinal axis of the vehicle, and at least one of which wheels is directionally controllable. At least one section of the vehicle is tiltable about the longitudinal axis of the vehicle and a sensor for measuring the magnitude and/or the direction of the load, for the purpose of producing and/or maintaining a change in direction of the directionally controllable wheel during travel, and/or for measuring the magnitude and/or the direction of a change in direction of the directionally controllable wheel during travel, is connected to a control element for controlling the at least one directionally controllable wheel. A power-assisted tilt element is provided for tilting the vehicle section about the longitudinal axis of the vehicle, which tilt element is connected to the sensor, in order to produce a tilt as a function of the registration by the sensor.

20 Claims, 11 Drawing Sheets

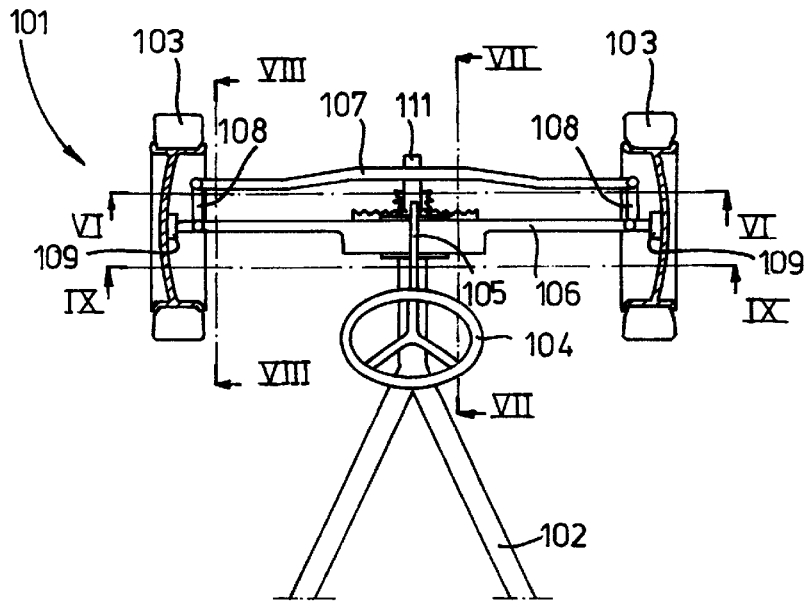
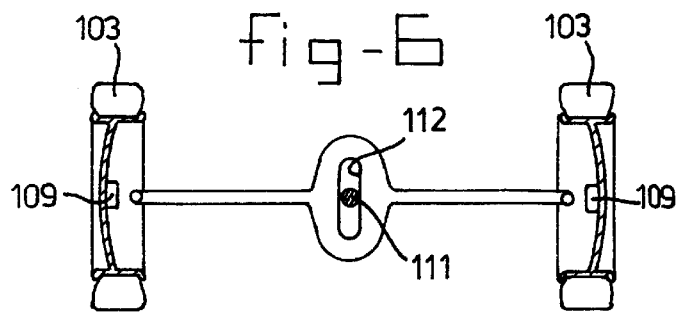
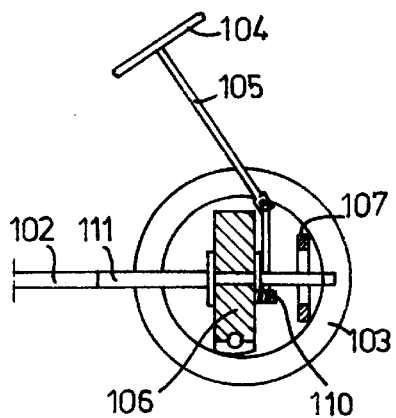
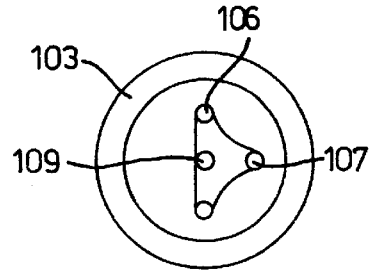

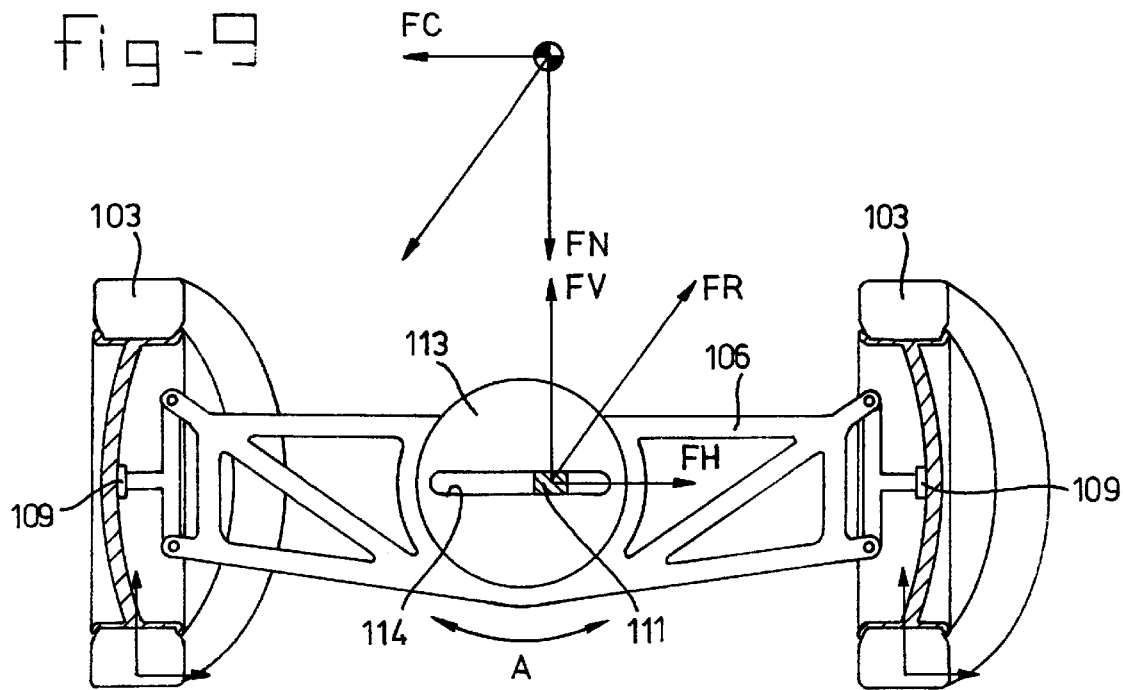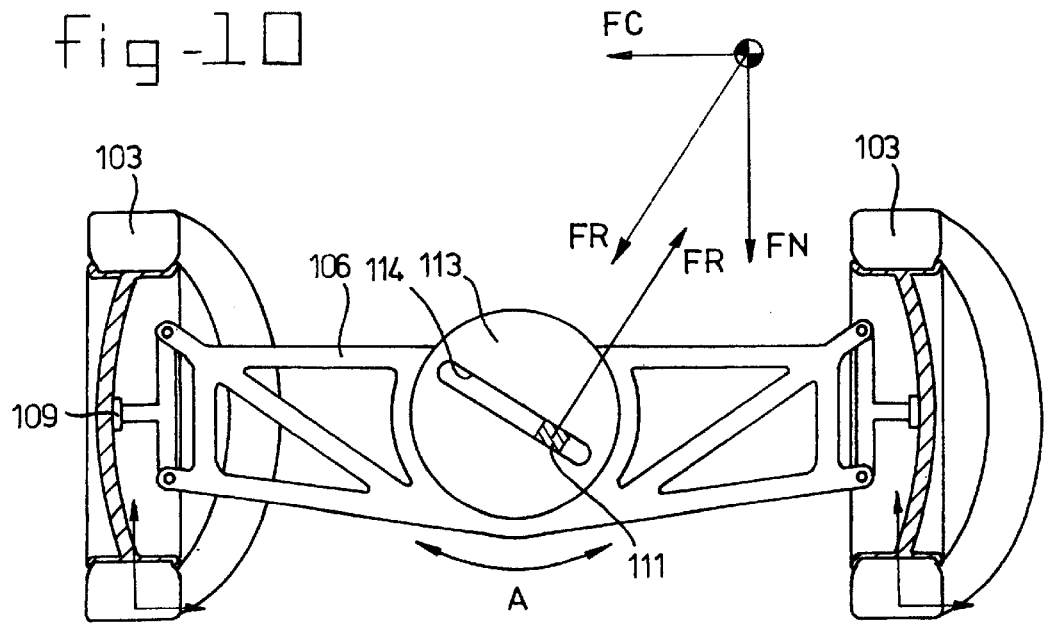

SELF-STABILIZING, DIRECTIONALLY CONTROLLABLE VEHICLE WITH AT LEAST THREE WHEELS

BACKGROUND OF THE INVENTION

The invention relates to a self-balancing vehicle with at least three wheels resting on the ground, at least two of which wheels are arranged on either side of the center of gravity with respect to the longitudinal axis of the vehicle, and at least one of which wheels is directionally controllable, and wherein at least one section of the vehicle is tiltable about the longitudinal axis of the vehicle for the purpose of producing and/or maintaining a change in direction of the directionally controllable wheel during travel, a control element for controlling the at least one directionally controllable wheel, and a power-assisted tilt element for tilting said vehicle section about the longitudinal axis of the vehicle.

A four-wheeled motor vehicle having a rear part which can tilt around a longitudinal axis with respect to a front part is described in EP-A-0592377. To this end a mechanical transmission links the axis of the front steering unit, which may be handle bars, to a tilt unit. A servo-mechanism of the hydraulic type may be controlled by the front steering unit. Two servo-control actuators are operated in opposite directions by a servo distributor subordinate to the front steering unit to provide the inclination of the chassis in both directions. The known vehicle has as a disadvantage that at a given angular position of the steering unit, a fixed inclination is imparted. No accommodation for drivers of varying weight is possible. Furthermore, driving speeds are not taken into account. Turning the steering units in a stationary position will cause the same inclination as turning the steering unit while driving at relatively high speed.

The aim of the invention is to provide a control system with which the tilting of the vehicle or a section of the vehicle towards the inside of the bend can be achieved efficiently, such that good stability can be ensured under all driving conditions, in particular at speeds higher than those which are customary when driving the vehicle into or out of a parking space.

To this end, the vehicle according to the invention is characterized in that the vehicle is self-balancing and comprises a sensor connected to the directionally controllable wheel for registering the magnitude and the direction of the load which is to be applied to the directionally controllable wheel for the purpose of producing and/or maintaining a change in direction thereof during travel, the sensor being connected to the tilt element to produce a tilt as a function of the registration by the sensor.

The steering force/the steering torque is measured, as it has been found that these load parameters give the best results. A force/torque of this type is generated automatically when the directionally controllable wheel has a certain castor, whilst the angle of tilt does not correspond to the driving speed and the bend radius intended by turning the steering wheel. By making use of this knowledge, the degree of tilt can be controlled by measurement of the said force/torque. In comparison with, for example, the known use of acceleration sensors, particularly natural direct driving characteristics are obtained by means of the present invention, so that the vehicle can also be operated by inexperienced persons.

From EP-A-153521 a vehicle body tilting system is known in which a hydraulic ram is connected to a spool type control valve. The control valve is actuated by the steering mechanism to quickly initiate a tilting movement upon turning of the steering mechanism. The control valve is also connected to a pendulum which progresses the tilting movement until the normally upright axis of the vehicle body is in line with the resultant vector of gravity and the centripetal acceleration.

A tilting system of this kind is relatively complex, has a certain lag and may be liable to malfunctioning in case the swinging motion of the pendulum is obstructed.

The use of a simultaneously tiltable directionally controllable wheel is to be preferred, by which means a particularly simple control system can be used. With this system it is fairly easy to achieve equilibrium for every tilt position since in every position of equilibrium for the tilt movement the steering load will then be zero or virtually zero. Thus, when starting to take a bend, as a result of there being a simultaneously tiltable directionally controllable wheel, the steering load will be highest initially and then gradually reduce as the tilted position of equilibrium is approached more closely while the vehicle is following the desired bend. It will be clear that by correct dimensioning of the control system the time which elapses between starting to take the bend and achievement of the tilted position of equilibrium can be short, by which means characteristics which correspond to the cornering characteristics of modern motorcycles can be achieved.

A position sensor can be incorporated in the control circuit in order, for example, to make the tilt speed proportional to the movement of the steering wheel. For example, the tilt speed is then lower the greater the inclination with respect to the vertical. Moreover, by this means a change in steering force which is proportional to the movement of the steering wheel can be achieved, so that a greater steering force is demanded for sharper bends. Furthermore, it is then also possible for the tilt speed back to the upright position to be higher the greater the tilt from the upright position.

It is preferable for a small restoring force to be exerted continually in a tilted position of equilibrium, so that a torque or a force can be continually exerted on the steering wheel. When the steering wheel is released, the vehicle will then automatically seek the neutral position for straight line travel. Resetting of this type can be achieved, for example, by correct positioning of linking elements and actuating contacts and short-circuit contacts in connection with, for example, a twistable component, as will be seen more clearly from the description of the appended figure.

Operation of the control system according to the invention can be speed-dependent, so that the system is completely inoperative, for example, when driving into or out of a parking space and/or carrying out other manoeuvres at low speed. Moreover, a power steering system known per se, which is likewise controlled dependent on speed, as is frequently customary, can be incorporated between the steering wheel and the directionally controllable wheel.

In order to execute the tilting movement, especially in the case where one section of the vehicle is hinged with respect to a section of the vehicle which does not change position, it is preferable to make use of one or more sets of drive elements, which assume a limit position when the vehicle is in the neutral (upright) position. The neutral position can be achieved simply in this way and the drive elements require no special adjustment for this purpose. Tilting from the neutral position can then be achieved by actuating one or other of the drive elements. In this context use can be made, for example, of a set of double-acting cylinder/piston assemblies, as is described and shown in more detail in the following description of the figure.

Tilting can also be achieved by, for example, lengthening or shortening the wheel suspension, as described, for example, in GB-A-2 148 217.

The invention is employed for both three-wheeled and multi-wheeled vehicles. In the case of a three-wheeler, two rear wheels arranged some distance apart on either side of the central longitudinal axis and a single front wheel arranged on the central longitudinal axis can be considered. In the case of multi-wheeled vehicles, two front and two rear wheels of the same or virtually the same track width, as for conventional cars, can be considered.

For advantageous functioning of the system even at low drive speeds, it is preferable to allow the drive wheels positioned on or essentially on a common radius of a bend to differ in respect of circumferential speed. In the case of the (rear) wheels driven centrally from a common drive motor, this can be achieved by means of a differential. For particular conditions, a differential action of this type can be temporarily lockable, optionally gradually, for example depending on the drive speed or the magnitude of a prevailing torsion between the drive wheels.

A further aim of the invention is to achieve a tilting effect with a vehicle which has at least two directionally controlled wheels on the same or essentially the same axle and which has an appreciable track width, that is to say a gap between the wheels which is appreciably greater than several times, for example five times, the tire width.

BRIEF DESCRIPTION OF THE DRAWINGS

The description of the figure relates to non-limiting illustrative embodiments which currently are regarded as best implementation of the invention, and reference is made to the appended drawings. In these drawings:

FIG. 5 shows, diagrammatically, a top view, partially in cross-section, part of the vehicle equipped with the mechanism according to the invention;

FIG. 6 shows a cross-sectional view along the line VI—VI in FIG. 5;

FIG. 7 shows a cross-sectional view along the line VII—VII in FIG. 5;

FIG. 8 shows a cross-sectional view along the line VIII—VIII in FIG. 5;

FIG. 9 shows a cross-sectional view along the line IX—IX in FIG. 5, with the vehicle in a first position;

FIG. 10 shows a view corresponding to FIG. 9, with the vehicle in a second position;

DESCRIPTION OF THE PREFERRED EMBODIMENTS

Figure 1:
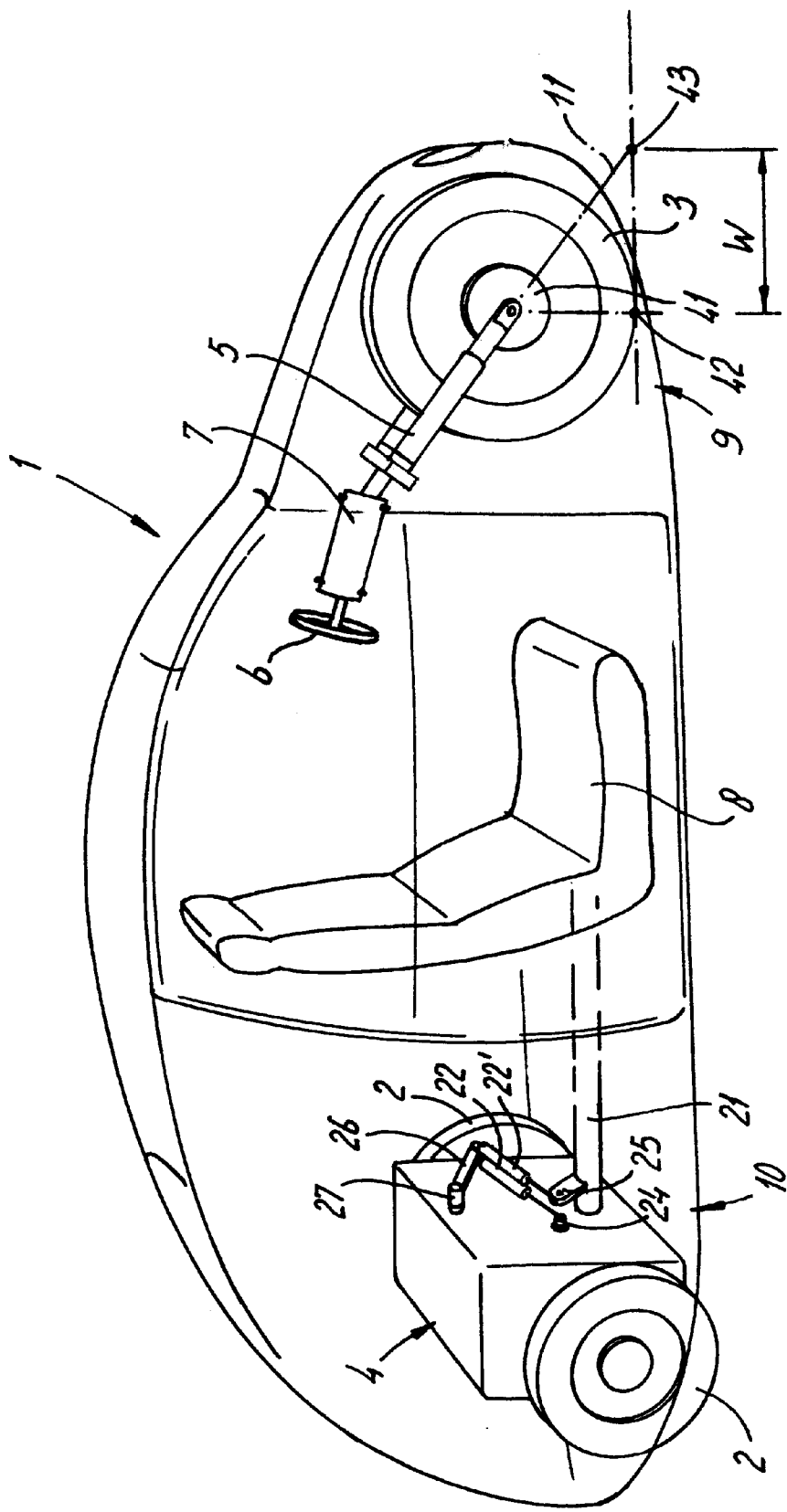
FIG. 1 shows, diagrammatically, a perspective view of a three-wheeled vehicle according to the present invention.

FIG. 1 shows, diagrammatically, a three-wheeled vehicle 1. The vehicle has two rear wheels 2, which are arranged coaxially some distance apart on either side of the longitudinal axis of the vehicle 1. The single, centrally arranged front wheel 3 is also shown. The two rear wheels 2 are driven by the engine. The drive unit 4, a conventional combustion engine, is arranged between the rear wheels 2, and the location thereof is shown diagrammatically in FIG. 2. As shown in FIG. 1, the front wheel 3 is attached to vehicle front section 9 via a front fork 5 which is rotatable about an axis 11 located in the vertical plane. The front fork 5 is directed such that, viewed in the direction of travel, the axis 11 reaches the ground at point 43, which is located in front of the contact point 42 of the wheel 3 with the ground. A linkage is accommodated between the steering wheel 6 and the front fork 5. The linkage comprises a steering torque meter or steering force meter 7. The steering wheel 6 can be coupled directly to the front fork 5, as, for example, in the case of a conventional bicycle. Optionally, the linkage can be constructed via a transmission, for example steering rods, control cables or the like (not visible). The linkage can also be of hydraulic or electrical design, etc. The type of meter 7 is dependent on the linkage selected. For example, the steering torque meter 7 is constructed as is shown in more detail in FIG. 3. The driver can sit behind the steering wheel 6 on a seat 8. Furthermore, the vehicle 1 shown in FIG. 1 is composed of two sections: the front section 9 and a rear section 10, which are designed so that they can tilt with respect to one another about the longitudinal axis of the vehicle 1. The front wheel 3, the front fork 5, the steering wheel 6, the steering torque meter 7 and the seat 8 are located in the front section 9. The two rear wheels 2 and the engine 4 are located in the rear section 10. The two rear wheels 2 are drivably coupled via a conventional differential to one another and to the engine 4. In another embodiment, the motor can be provided within the tilting part 9. The front wheel 3 can be coupled to the remainder of the vehicle 1 in such a way that so-called hub steering is produced.

As is shown in more detail in FIG. 2, a tilting tube 21, which extends rearwards from the front section 9, runs along the underside of the front section 9. The tilting tube does not necessarily have to run horizontally. The center line of said tilting tube 21 determines the central longitudinal axis of the vehicle 1. The tilting tube 21 is inserted, so that it is rotatable about the center line thereof, in a bearing bush (not shown) on the engine 4 in the rear section 10 of the vehicle 1. By means of the rotary bearing of the tilting tube 21, the front section 9 is able to tilt left and right about the central longitudinal axis of the vehicle 1, whilst the rear section 10 remains in an unchanged position. During tilting of the front section 9, the front wheel 3 will tilt simultaneously in the same tilt direction.

In order to determine the degree of tilt, according to the invention the steering wheel movement, or the steering force or the steering torque is measured, as is explained in more detail more particularly with reference to FIG. 3. Tilting itself can be achieved by means of a tilt mechanism such as is shown in detail in FIG. 2. In the latter figure, two double-acting piston/cylinder combinations 22, 22' are shown. The free end of the piston rod 23 is hingeably connected to a fixing lip 24 on the engine 4. The free end of the piston rod 23' is hingeably connected some distance away from the center line of the tilting tube 21 to a fixing lip 25 which extends from the tilting tube 21. At the opposite end, the piston/cylinder combinations 22, 22' are hingeably connected to one another and to a connecting rod 26, the other end of which is hingeably connected to a further fixing lip 27 on section 10 or section 9; here said lip 27 is on the engine 4. Furthermore, 28, 28' and 29, 29' indicate the connection ports on the cylinders of the cylinder/piston combinations 22 and 22' respectively for connection to the hydraulic circuit, as is, for example, described and shown more particularly in FIG. 3. The port 28 is coupled directly to the port 29'. The port 28' is coupled directly to the port 29. Consequently, no more than two lines run between the torque meter 7 and the cylinder/piston combinations 22, 22'. However, the ports 28, 28', 29, 29' do not have to be coupled as indicated, and more than two lines can be arranged between the torque meter 7 and the cylinder/piston combinations 22, 22'. If the pressure at the port 28 is higher than that at the port 29, the vehicle 1 will tilt to the right. Tilting to the left occurs in the converse situation. The position of the piston 30, 30' is shown in broken lines in FIG. 2 in each case.

When driving in a straight line (FIG. 2a), the two piston rods 23, 23' are in the maximum extended position and both pistons 30, 30' are in contact with respective stops (not shown) which form part of the maximum end-of-stroke position. In this position, the front section 9 of the vehicle 1 is in the neutral position, that is to say section 9 is vertical and the front wheel 3 is likewise vertical and aligned in the position for straight-line travel, that is to say parallel to the central longitudinal axis of the vehicle 1, and thus parallel to the center line of the tilting tube 21. This position can be set reliably and efficiently because in this position the two pistons 30, 30' are in the fully extended position. FIG. 2b shows the situation for tilting to the right in the drawing. In this case the piston 30' of the cylinder/piston combination 22' is moved, whilst the piston 30 preferably remains in its position. The front wheel 3 is accordingly turned to the right about the axis 11. At the same time, the front wheel 3 is tilted to the right together with section 9. In FIG. 2b the piston 30' is shown in the fully retracted position. This corresponds to the position of maximum tilt to the right. It will be clear that intermediate positions can also be assumed by the piston 30', with corresponding intermediate tilt positions.

Figure 2A:
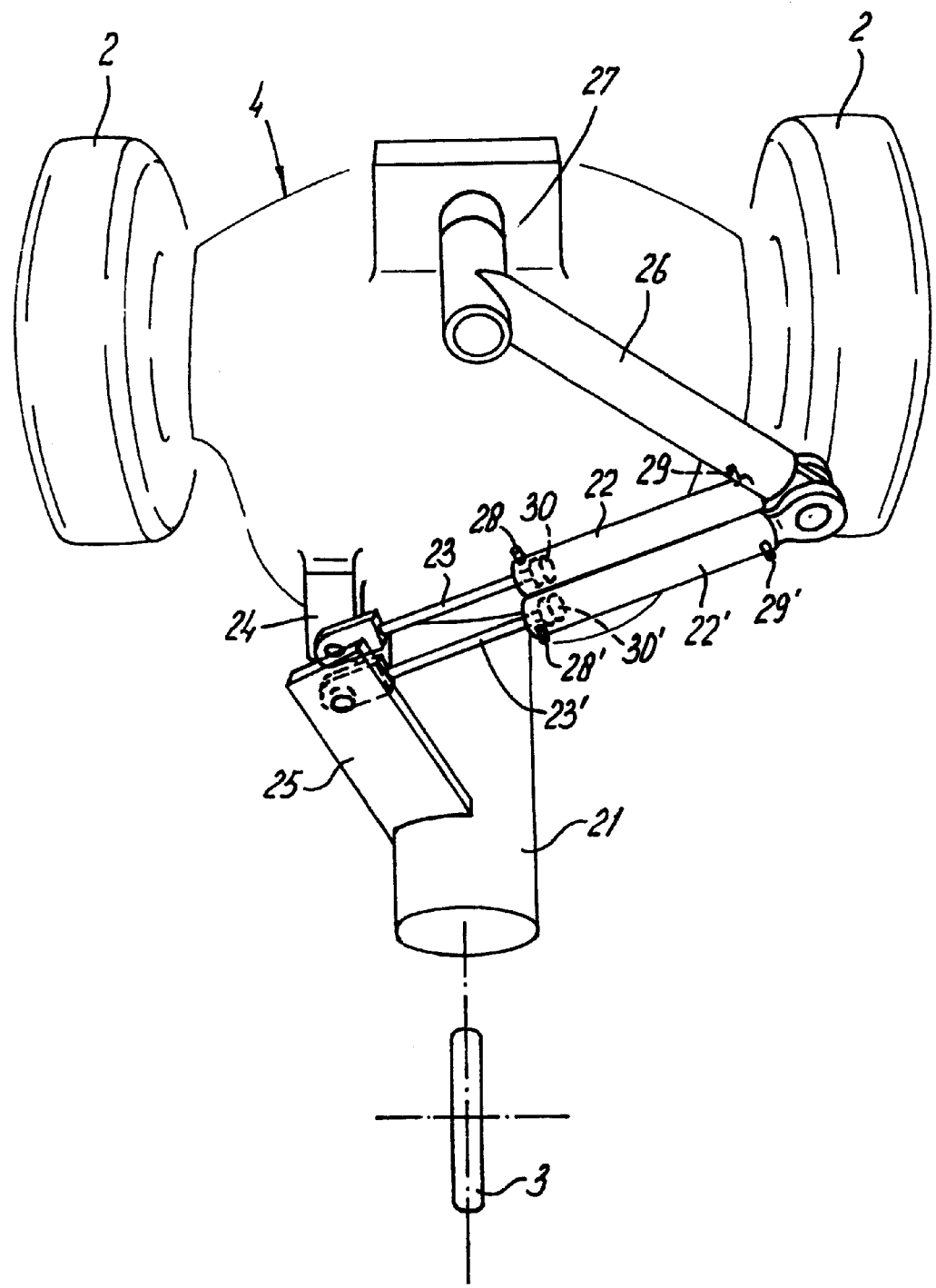
FIGS. 2a to 2c show in more detail the tilt mechanism as used in the vehicle according to FIG. 1.
Figure 2B:
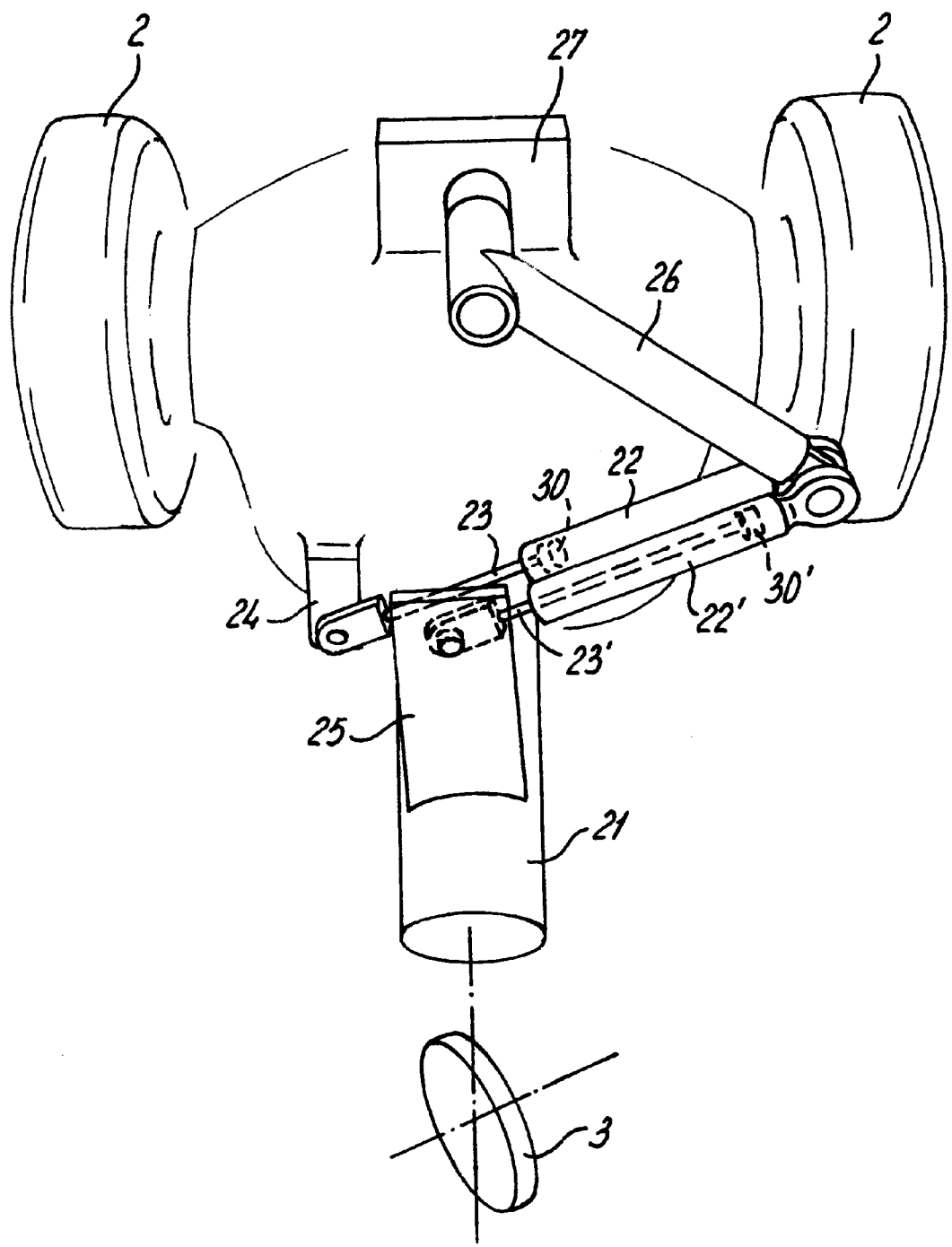
Figure 2C:
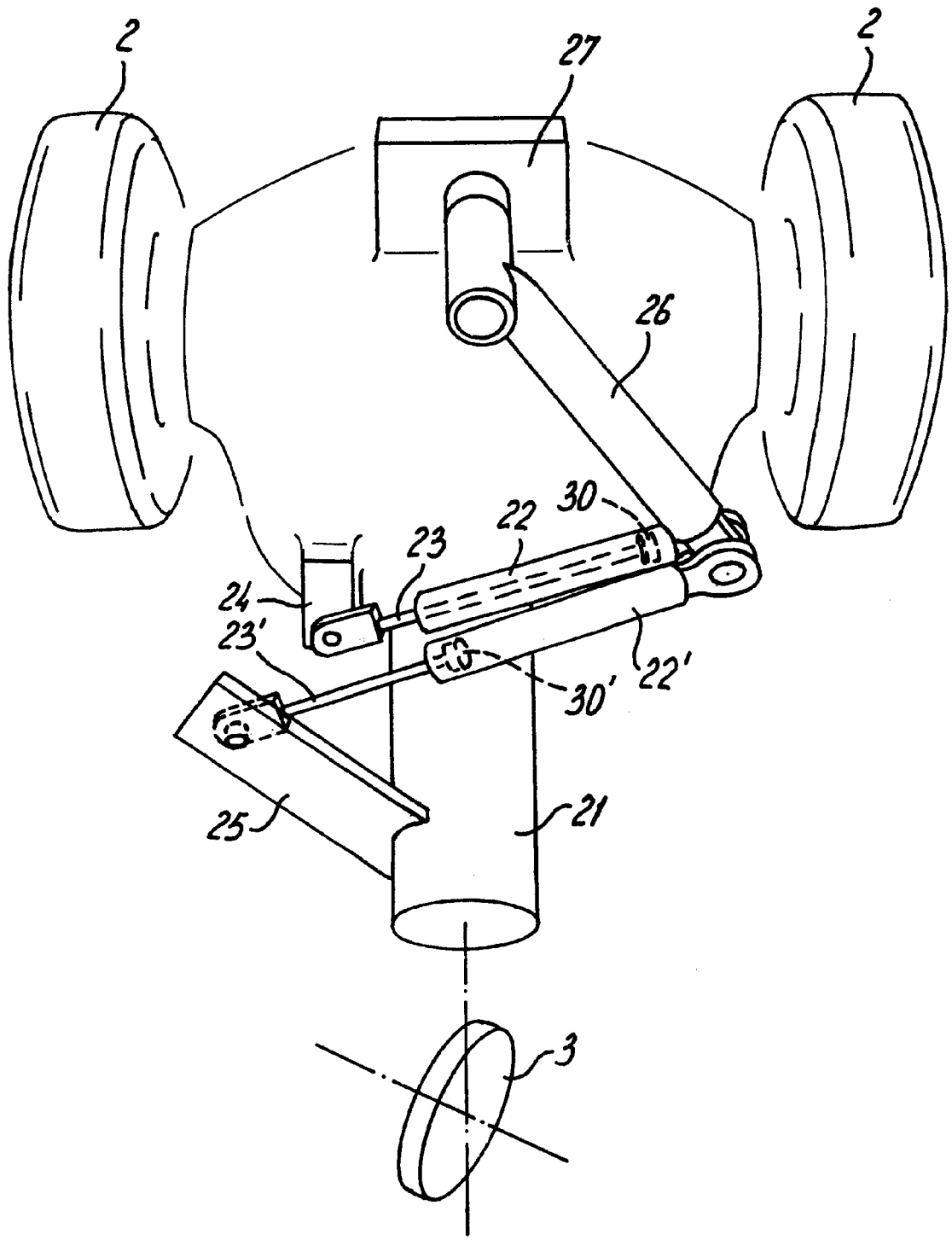

FIG. 2c shows the situation when the front section 9 is tilted to the other side, that is to say to the left in the drawing. The piston 30 is now moved from the fully extended position shown in FIG. 2a, whilst the piston 30' is preferably held in an unchanged position. Once again, the front wheel 3 is turned accordingly, that is to say to the left.

The neutral position shown in FIG. 2a is automatically achieved from any inclined position if, for example, the maximum hydraulic pressure is acting on either side of the pistons 30, 30'. In such a case, the pistons 30, 30' are automatically driven into the fully extended position shown in FIG. 2a because of the prevailing difference in surface area on either side of each piston as a result of the presence of the piston rods 23 and 23', respectively. By establishing a pressure difference over the pistons 30, 30' via the ports 28, 29 and, respectively, 28', 29', a corresponding movement of the piston 30 or 30' can then be achieved depending on the direction and the magnitude of the steering force or the steering torque and/or the movement on the steering wheel, and/or the angular rotation of the front wheel 3 about the axis 11.

Of course, tilt mechanisms other than that shown in FIG. 2 can also be used. For example, the cylinder/piston assemblies 22, 22' can be replaced by one or more linear motors of another type, such as, for example, electrically or magnetically driven motors. It is also possible, for example, to elect to use a rotary drive element, which can be integrated in, for example, the tilting tube 21. Pneumatic operation, for example, can also be chosen instead of hydraulic operation. The set of cylinder/piston combinations 22, 22' can also be replaced by a single cylinder/piston combination, the piston 30 of which assumes a central position between the two end-of-stroke positions when the front section 9 is in the neutral, that is to say non-tilted, position. However, the alternative embodiment according to FIG. 2 is to be preferred for the purpose of accurate and reliable adjustment of the neutral (straight-line travel) position.

A hydraulic control, which is particularly advantageous in connection with the alternative embodiment shown in FIG. 2, will now be discussed in more detail with reference to FIGS. 3 and 4. FIG. 4 shows the assembly of the steering torque meter 7 and the steering rod 31. The steering torque meter 7 comprises an essentially cylindrical housing 34, which at one end is connected to the steering rod 31 so that it cannot rotate. A steering slider 32 is inserted in housing 34. At the free end of the housing 34, steering slider 32 is connected so that it cannot rotate to the steering rod 31, and encloses the steering rod 31 with play between them. The outer circumference of the steering slider is provided with a number of flats 35, 35', 36, 36', as can be seen more clearly from FIG. 3. If a torque is exerted on the steering rod 31, steering rod 31 will twist, as a result of which the housing 34 will turn with respect to the steering slider 32. FIG. 3 shows the steering torque meter 7 in cross-section, accommodated in a hydraulic system, which is shown diagrammatically. At the cylindrical peripheral surface, the steering slider 32 has two sets of diametrically opposed flats, of which the flats 35, 35' are broader than the flats 36, 36'. Eight ports 37 made in the housing 34 open into the interior of the housing and, viewed in the cross-section of the housing 34, are arranged so that they are distributed at equal angles over the circumference. As is shown, the uppermost and lowermost ports 37 in the drawing are in fluid connection with a pressure pump 38 and a pressure accumulator 39. In the embodiment shown, the housing 34 and the steering slider 32 are symmetrical in cross-section. An asymmetrical embodiment is optionally also possible, in which case the accumulator is connected to the housing 34 at one location only and the ports 28, 29' and, respectively, 28', 29 are connected via a common line to the housing 34.

The two ports 37 located in the horizontal middle plane in the drawings are both connected to a discharge line 40, which, optionally via an intermediate gear pump 41, opens into the hydraulic fluid collection vessel 42. The prevailing pressure in hydraulic fluid collection vessel 42 is lower than the prevailing pressure in the pressure accumulator 39. The optional gear pump 41 rotates at a speed which is proportional to the vehicle speed. The faster the gear pump 41 rotates, the lower will be the counter-pressure offered by the gear pump 41 to the hydraulic fluid flowing from the housing 34 and through the line 40. At low revolutions of the gear pump 41, the hydraulic fluid will encounter greater resistance, as a result of which the action of the tilt mechanism will be correspondingly impeded. This is advantageous, for example, in connection with driving into and out of a parking space, which circumstances are associated with large movements of the steering wheel or large steering moments/steering forces, tilting of the vehicle section 9 not being desired and even being a nuisance. An element other than a gear pump 41 can also be chosen to restrict the operation of the tilt mechanism at relatively low drive speeds. For example, a speed-controlled shut-off valve can be chosen instead of the gear pump 41, which valve is closed further and further as the speed decreases.

The other openings 37 shown in the drawing are connected to the respective openings in the cylinder/piston combinations 22 and 22' respectively (see FIG. 2).

If a gear pump 41 is used, it is preferable to incorporate a non-return valve 43 as shown to prevent pressure build-up and/or the production of a vacuum in the pump and in the circuit as a consequence of the action of the gear pump 41.

Figure 3A:
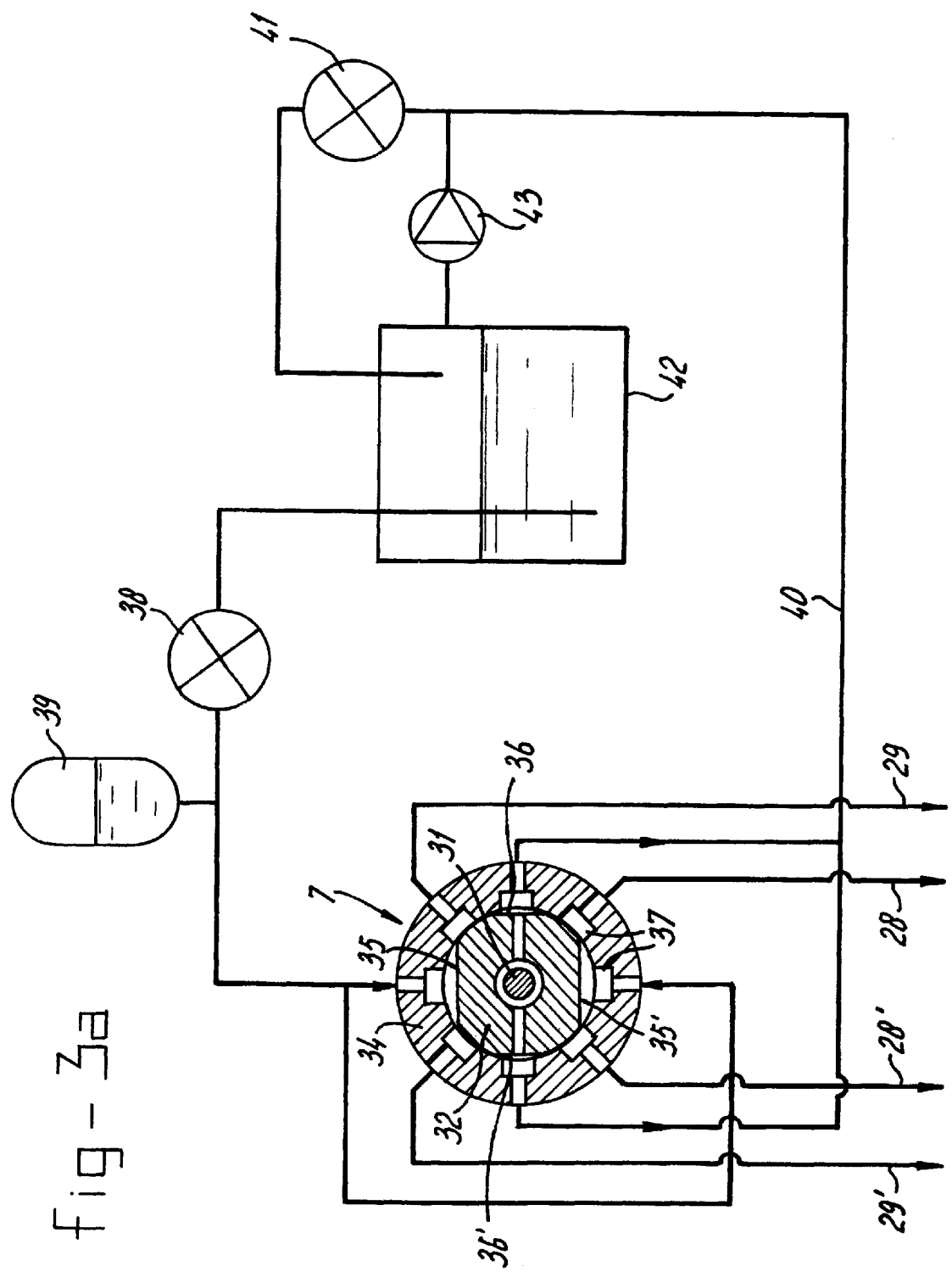
FIG. 3a shows, diagrammatically, a sketch showing the principle of the hydraulic system which can be used in the tilt mechanism shown in FIG. 2.
Figure 4:
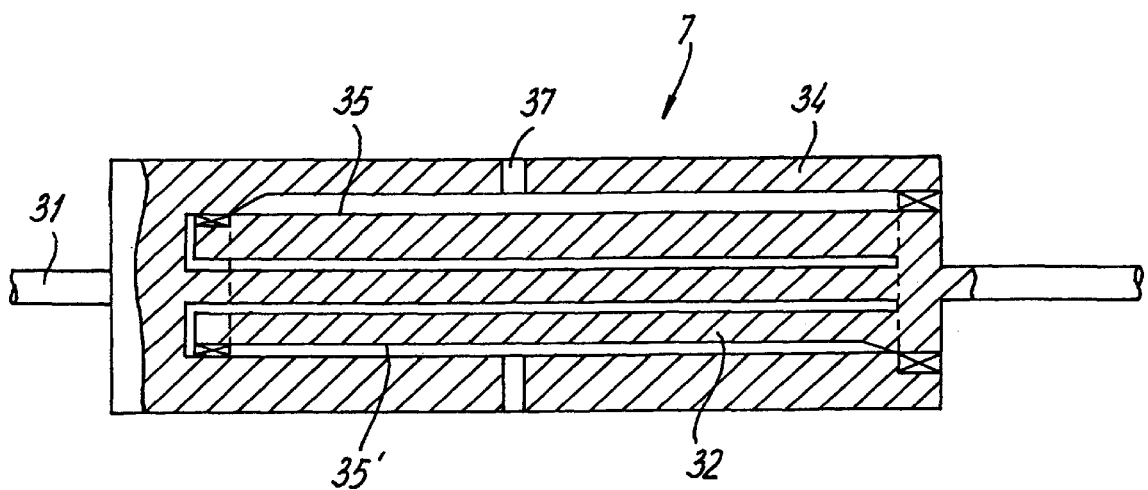
FIG. 4 shows a side view in partial cross-section of a torque meter.

The hydraulic fluid system as shown in FIG. 3 functions as follows:

FIG. 3a shows the neutral position of the steering slider 32 inside the housing 34, which corresponds to the straight-line travel position of the vehicle 1. It can clearly be seen that the flattened parts 35 on the steering slider 32 are sufficiently large to bring the ports 28, 28' and 29, 29' into fluid connection with the pressure accumulator 39. Consequently, the same pressure prevails on either side of the pistons 30, 30' (FIG. 2), so that the pistons 30, 30' are in the fully extended position shown in FIG. 2. The flats 36, 36' are of such small size that, in the neutral position of the steering slider 32, they are in connection only with the hydraulic fluid discharge 40. This hydraulic fluid discharge 40 is not connected via the steering torque meter 7 to the pressure accumulator 39.

Figure 3B:
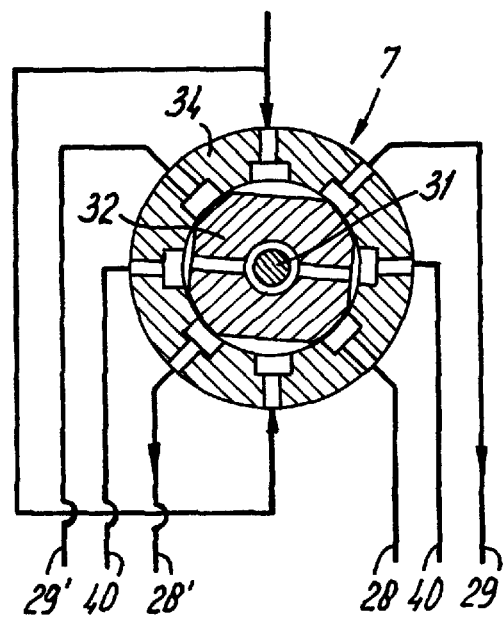
FIG. 3b shows part of FIG. 3a in a subsequent position.
Figure 3C:
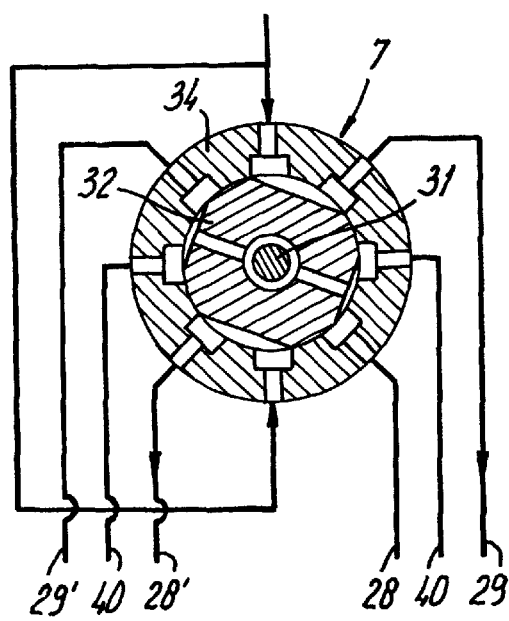
FIG. 3c shows part of FIG. 3a, shown in a further position.
Figure 3D:
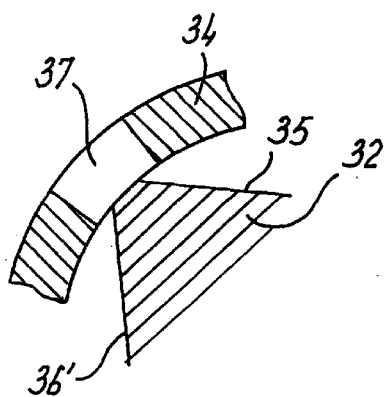
FIG. 3d shows a detail of an alternative embodiment of FIG. 3b.

When the steering slider 32 is rotated slightly (for example towards the right as shown in FIG. 3b), the connection between the ports 28, 28', 29, 29' and the accumulator 39 is maintained. However, fluid is now also able to pass via the flats 36, 36' and thus to flow into the line 40. The position of the steering slider 32 with respect to the housing 34 in this situation is shown in more detail in FIG. 3d. Consequently, in this position there is "leakage" of fluid from the accumulator 39 to the line 40. Consequently, a pressure loss arises, the extent of which depends on the degree to which fluid can leak away. By this means, reliable control of the tilt speed is possible. On turning further to the right (FIG. 3c), the ports 28 and 29 are disconnected from the pressure accumulator 39. They are then connected only to the line 40 and accordingly pressure loss arises in said lines, as a result of which the pistons will start to move. Tilting of the vehicle 1 then occurs. Consequently, the pressure difference over either the piston 30 or the piston 30' will be sufficiently large for movement from the position shown in FIG. 2a in the direction of the position shown in FIGS. 2c and 2b respectively. While the piston 30 or the piston 30' is moving, the steering slider 32 will slowly rotate back into the position shown in FIG. 3b, since the requisite steering force or steering torque or the requisite movement on the steering wheel will decrease automatically as a result of increasing tilting of the vehicle. As soon as the equilibrium tilt position is reached which is associated with the prevailing conditions for following the bend, the situation shown in FIG. 3b will prevail, in which situation a small steering force or movement on the steering wheel still has to be provided by means of the steering wheel 6. As soon as the steering wheel 6 is turned in the opposite direction or is released, the steering slider 32 will assume the position shown in FIG. 3a, or be rotated beyond this point in the opposite direction, so that the pistons 30, 30' (FIG. 2) are returned to the initial position as shown in FIG. 2a.

Of course, variants other than that shown and described here can also be used for implementation of the invention. For example, a conventional power steering mechanism can also be accommodated between the steering wheel 6 and the front wheel 3, in order to generate some of the steering force required for steering, especially at low driving speeds. This mechanism can, for example, be connected to the same pressure accumulator 39, pressure pump 38 and hydraulic fluid collection vessel 42 as shown in FIG. 3a. A different embodiment of the steering torque meter, other than the embodiment shown in FIG. 3, can also be employed. Furthermore, it is, for example, also possible to provide the vehicle with more than one directionally controllable wheel which moves with the tiltable section of the vehicle. The steering torque meter 7 shown in FIG. 3 can also be suitable for electronic control. To this end, the flattened parts 35, 35' and 36, 36' can be designed as sliding contacts and the positions of the openings 37 determine the various electrical connection points with a power supply, the earth and the connection points for one or more linear motors. Instead of measuring a torque, the meter 7 can also be designed to measure a force. The prevailing normal force between the steering wheel and the front fork is then employed. This force is directly proportional to the steering torque exerted. A shut-off valve which is slidable in the longitudinal direction of the steering rod can then be arranged inside a housing provided with ports, which shut-off valve controls the opening and closing of the ports as a function of the steering force developed. The shut-off valve can be held in the neutral position by means of, for example, spring elements. On the basis of FIG. 3, a person skilled in the art will easily be able to produce an electronically controlled steering torque meter of this type on the basis of his specialist knowledge. However, a hydraulic system, which provides greater reliability, is preferred. Such a level of reliability is important, in particular for cars.

FIG. 5 shows part of a vehicle 101. The figure shows the central frame 102, to which the bodywork (not shown), seats, control pedals and the like are attached in a manner not shown in more detail. The frame 102 is drivable on wheels. Only the two front wheels 103 are shown in FIG. 5. These wheels could optionally also be the rear wheels. It will be clear to a person skilled in the art that the vehicle 101 is also drivably supported on one or more wheels at the rear, which is not shown in FIG. 5. The one or more rear wheels can be a single, for example centrally positioned, wheel, or also two wheels with a track width which is, for example, comparable with that of the front wheels 103. The vehicle 101 can be a twin-axle or multi-axle vehicle. The front wheels 103 are, as shown, arranged on the same axle. When two wheels are positioned relatively close alongside one another on the same or essentially the same axle (for example with a gap between them which is no greater than a few wheel widths), such wheels are to be regarded as one wheel within the framework of the present invention. In fact, the number of wheels is not important as long as the vehicle can be kept in equilibrium by the wheels. This implies that the vehicle must be at least a so-called three-wheeler.

FIG. 5 also shows a steering wheel 104, which is rotatable about the steering column 105. A steering force sensor (not shown) or steering wheel movement sensor (not shown) can be mounted on the steering column 105 or in any other suitable location. The sensor can be of the type described with regard to FIG. 4. The data from such a sensor are used to control the degree to which the vehicle tilts inwards in the bend. The data from said sensor are transmitted to a so-called vehicle tilt mechanism (not shown), by means of which the tiltable section of the vehicle is tilted with power assistance (in the desired direction and to the desired extent) with respect to the non-tiltable section. For example, the vehicle tilt mechanism has one or more hydraulic or pneumatic piston/cylinder combinations or other drive elements which can be lengthened and shortened, or rotary drive elements, in order to achieve controlled, power-assisted tilting of two sections with respect to one another. The tilt mechanisms can be of a type such as is shown in FIG. 2. At its end remote from the steering wheel 104, the steering column 105 has a generally customary steering transmission mechanism for sidewards movement of the rear steering rod 106. There is also a front steering rod 107, which is connected in the conventional manner via hinging links 108 to the hub 109 of each wheel 103. The assembly of the steering rods 106 and 107 and the links 108 determines a system for hub steering of the wheels 103 which is customary in cars. FIG. 7 shows in more detail how the steering column 105 engages via the steering transmission mechanism 110 on the rear steering rod 106. In this specific case, it has been elected to use a conventional rack transmission.

As can be seen in particular from FIG. 5, the frame 102 is supported with respect to the steering rods 106, 107 via a beam element 111. As can be seen in particular from FIG. 7, said beam element 111 extends both through the rear steering rod 106 and through the front steering rod 107. To this end, the front steering rod 107 is provided with a vertical slit 112. As can be seen from FIGS. 9 and 10 the rear steering rod 106 is equipped with a rotary element 113 in order to rotate about a longitudinal axis parallel to the longitudinal axis of the vehicle (that is to say in accordance with the double arrow A in the plane of the drawing in FIGS. 9 and 10). A slit 114 is made in rotary element 113, in which slit the beam element 111 is slidably enclosed. As is shown in FIG. 6, the beam element 111 has a circular cross-section at the location where said beam element 111 extends through the slit 112. As can be seen from FIGS. 9 and 10, the beam element 111 has a rectangular cross-section at the location where beam element 111 extends through the slit 114. The beam element 111 is thus able to rotate about its longitudinal axis with respect to the slit 112 but is not rotatable about said longitudinal axis with respect to the rotary element 113. When the vehicle is travelling in a straight line (FIG. 9), the slit 114 will be horizontal. When travelling round a bend (a bend to the right is shown in FIG. 10), the slit 114 will assume an inclined position. For straight-line travel, the beam element 111 is mainly centered with respect to the axis of rotation of the rotary element 113. The beam element 111 is held centered by means of a suitable castor of the wheel 103 with respect to, for example, the front steering. rod 107. On turning the steering wheel 104 (to the right in FIG. 9), the rear steering rod will move to the left in the drawing, so that the beam element 111 accordingly moves to the right from its central position. A right-hand bend is taken. A horizontal force FH must be generated by means of the steering wheel 104 in order to achieve the desired shift of the rear steering rod 106 to the left. This requires a torque to be exerted on the steering wheel 104, the magnitude and the direction of which can be measured by the steering force sensor (not shown), which has already been described above and which, for example, is mounted on the steering column 105. The horizontal force FH, together with the vertical force FV (the force of reaction to gravity), determines a resultant FR, which initially is directed at an angle to the longitudinal direction of the slit 114. The vehicle tilt mechanism (not visible) is controlled via the signals from the steering force sensor in order to cause the tiltable section 102 of the vehicle 101 to tilt to the right about the longitudinal axis. Consequently, the rotary body 113 will turn about its axis; when steering to the right, it will turn as far as an equilibrium position, shown in FIG. 10. As a result of said tilting, the resultant FR will adopt an increasingly perpendicular position with respect to the longitudinal direction of the slit 114, with the result that the necessary steering force to be generated via the steering wheel 104 decreases, at the same rate, to zero when the tilted equilibrium position has been reached. The steering force sensor detects, at the same rate, a continually decreasing steering force on the steering wheel 104, and will control the vehicle tilt mechanism accordingly. When, while taking the bend at constant speed and bend radius (and side wind and other stresses), the steering force on the steering wheel 104 has dropped to zero, the vehicle tilt mechanism will maintain the tilted equilibrium position of the tiltable vehicle section. If the frame 102 is supported at its rear by a centrally located, single rear wheel (three-wheeler configuration), the centrally mounted rear wheel can be designed to tilt with the frame 102. If the vehicle is, for example, a four-wheeler, where the rear of the frame 102 is likewise supported on two wheels, with a track width which corresponds to that of the front wheels 103, it would be possible to choose a freely rotatable rotary body for attachment of the frame 102 to the rear wheels, which rotary body is likewise freely rotatable about an axis parallel to the longitudinal axis of the vehicle 101 with respect to the rear axle. Of course, other solutions will be apparent to those skilled in the art. By means of a feedback mechanism (for example based on power-assisted steering mechanisms for vehicles), it is possible to ensure by artificial means that a steering force still has to be exerted on the steering wheel 104 even in the tilted equilibrium position (FIG. 10), so that the driver retains "feel" while taking a bend. To this end it is possible, for example, to incorporate a suitable torsion element in the steering column 105. Optionally, it is possible to ensure that the tiltable section of the vehicle does not tilt fully as far as its equilibrium position while taking a bend. Consequently, the resultant force FR will never be completely perpendicular to the longitudinal direction of the slit 114. Consequently, the driver must continue to exert a force on the steering wheel 104, even when taking a bend of constant bend radius at constant speed. It will be clear to those skilled in the art that the deviation between the tilted equilibrium position and the actual tilt position while taking a bend can follow a progressive curve, so that, when driving faster and/or taking a sharper bend, the driver notices a feedback matched to the conditions. This type of feedback mechanism is particularly direct and, for example, does not require a torsion element which has to be actuated from the outside, or the like.

Finally, FIG. 8 shows the position of the rear steering rod and the front steering rod 107 with respect to the hub 109. It will be apparent that the rear steering rod 106 is in line with the hub 109 and with the point of engagement of the tire on the road. The necessary castor is achieved by means of the front steering rod 107.

During tilting of the frame 102, the beam element 111 will move up and down with respect to the slit 112 in the front steering rod 107.

In this way it is possible to control the tilting of the frame 102 about an axis parallel to the longitudinal axis of the vehicle 101 as a direct function of the movement of the steering wheel or of the steering force, as a result of which there is no further need for, for example, acceleration sensors.

It is not per se necessary to bring the rotary element 113 into the plane of the rear steering rod path. What is important is that the frame 102 is guided along a preferably straight guide surface, which guide surface can assume a horizontal or inclined position with respect to the non-tilting section of the vehicle 101 (here: the steering rods. 106 and 107).

Figure 11:
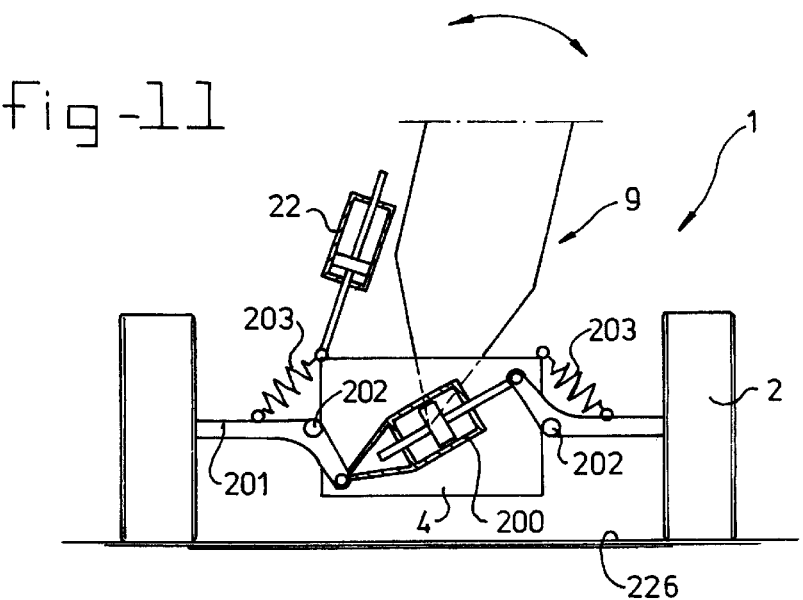
FIG. 11 shows a rear view of the vehicle shown in FIG. 1 according to a further alternative embodiment of the invention.
Figure 12:
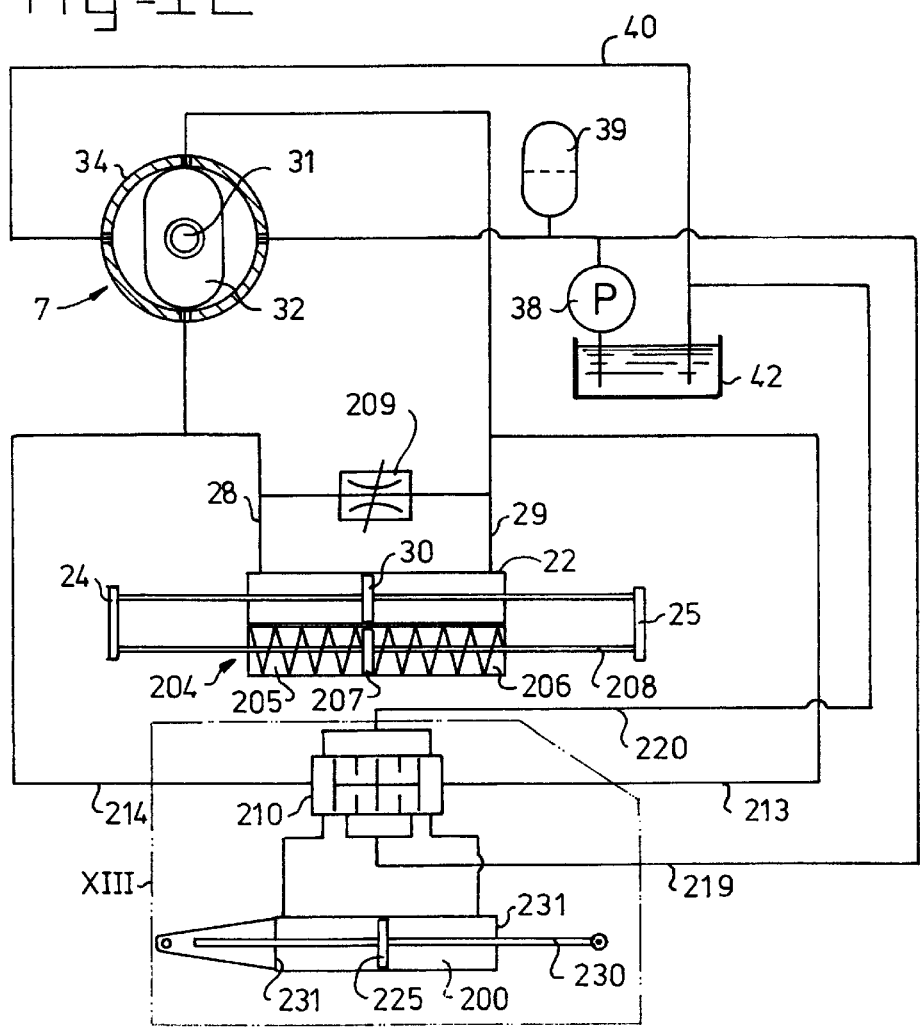
FIG. 12 shows a diagram of the hydraulic system which can be used in the alternative embodiment shown in FIG. 11.
Figure 13:
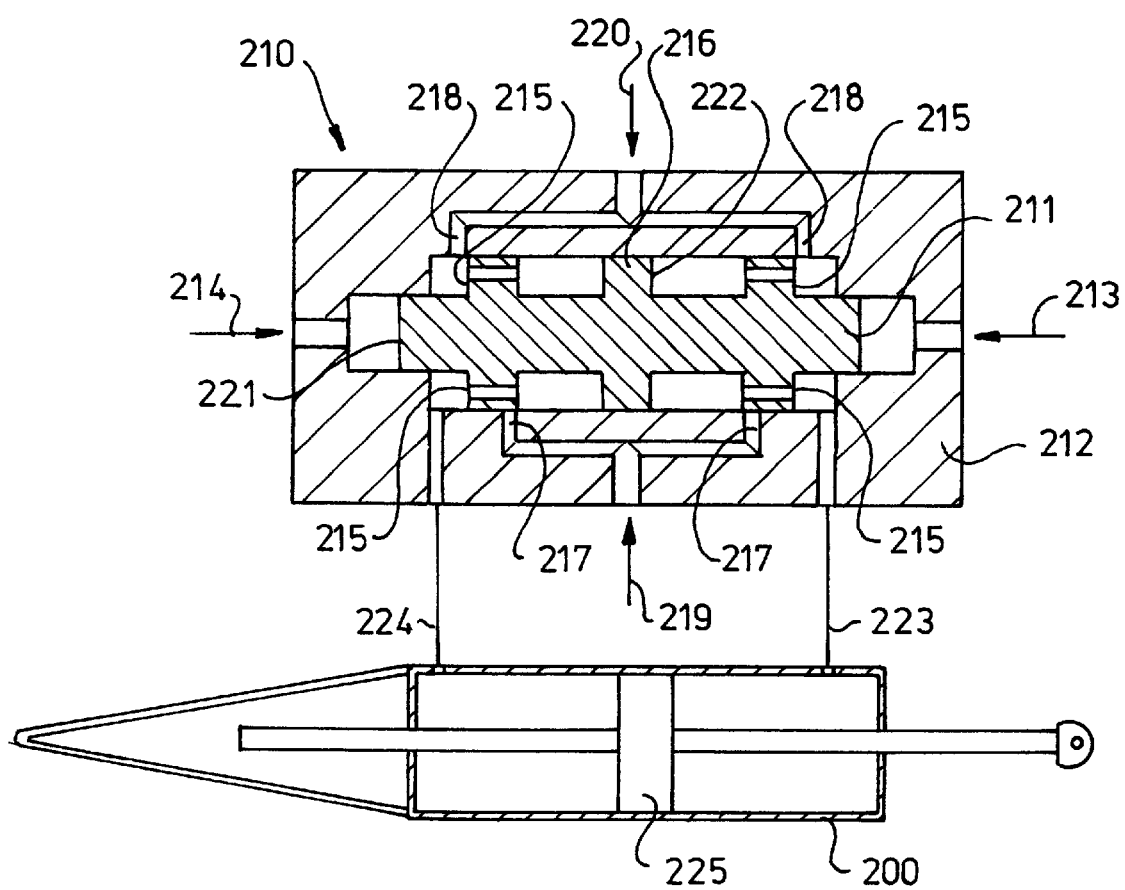
FIG. 13 shows detail XIII of FIG. 12, in cross-section.

The components in FIGS. 11, 12 and 13 which correspond to those in FIGS. 1–4 have the same reference symbols.

FIG. 11 shows a particularly advantageous embodiment for the non-tiltable section 10 of the vehicle 1. With this embodiment the negative effect of the spring suspension of the rear wheels 2 during tilting of vehicle section 9 can be restricted to an appreciable extent or can even be eliminated. This is possible without it being necessary to choose a particularly complex construction for the spring suspension of the wheels 2. The general behavior of the vehicle 1 can also be improved by means of the embodiment according to FIG. 11. The embodiment according to FIG. 11 is based on the insight that a possibly disruptive effect of the spring suspension of the rear wheels 2 on a tilt movement of the tilting section 9 can be reduced or can be eliminated by generating a torque, by power-assisted means, with the wheels 2, which torque opposes the reaction torque generated by the non-tilting section 10 when the tilting section 9 is tilted. This counter-torque to be generated in a power-assisted manner by means of the wheels 2 can be of the same magnitude as the reaction torque. However, under certain circumstances this is not absolutely essential. The counter-torque is generated with the aid of the drive element 200, which in this case is a double-acting piston/cylinder assembly. Each wheel 2 is connected by means of a pivot arm 201 to the drive element 200. Each pivot arm 201 is pivotally connected at the hinge point 202 to the non-tilting section 10 of the vehicle. By lengthening or shortening the drive element 200, a pivoting of the pivot arms 201 in the opposite direction about the respective hinge points 202 can be achieved, in order thus to generate the counter-torque. The spring suspension of the wheels 2 is provided by means of spring and damper elements 203, which can be of a conventional type and here are shown diagrammatically only. Elements 203 are connected on one side to a respective pivot arm 201 and to the non-tilting section 10 of the vehicle 1.

The drive element 200 is preferably constructed in such a way that the action of the elements 203 is not affected, or is affected as little as possible, during activation of said drive element 200. The drive element 200 must therefore preferably be constructed in such a way that movements of the wheels 2 with respect to the non-tilting section 10 as a consequence of, for example, unevenness in the road surface are permitted even at the point in time when the counter-torque prevails. This implies that the compression or relaxation of the elements 203 as a consequence of such movements of the wheels 2 is permitted by the element 200. In the case of hydraulic or pneumatic embodiment of the actuation of the element 200, an embodiment corresponding to FIG. 12 is preferred in this context.

The steering torque meter or steering force meter 7 shown in FIG. 12 is a simplified embodiment of the alternative embodiments according to FIGS. 3 and 4. It will be clear to those skilled in the art how the steering force or steering torque meter 7 according to FIG. 3 or 4, or further variants thereof, can be used in the embodiment according to FIG. 12. The meter 7 is primarily used to control the drive element 22 of the vehicle tilt mechanism. The construction of said drive element 22 differs from that shown in FIG. 2. It will be clear to those skilled in the art how the drive for the tilt mechanism according to FIG. 2 can be used in the embodiment according to FIG. 12. In the embodiment according to FIG. 12, it has been chosen to use a single, double-acting piston/cylinder assembly 22 to achieve the tilting effect. Piston/cylinder assembly 22 is connected in series with a pretensioning assembly 204, by means of which the piston/cylinder assembly 30 is pretensioned to the neutral mid position. In the alternative embodiment shown, to this end the restoring element 204 is formed from two spring elements 207, 206 on either side of a dish element 207 which is connected by means of a rod 208 to the lip elements 24, 25. Of course, alternative elements for restoring the drive 22 of the tilt mechanism to its neutral, mid position are also conceivable. A throttle element 209, with adjustable setting, is accommodated between the lines 28, 29 which run to the drive element 22.

A control element 210 is likewise incorporated in she hydraulic circuit of FIG. 12. Control element 20 is shown in more detail in FIG. 13. The meter 7 controls the position of the control element 210, in order thus to control the drive element 200.

The control element 210 is shown in more detail in FIG. 13. Control element 210 has a casing 212 which has a cavity in which a body 211 is movable from right to left and vice versa in the drawing. The movement of said body 211 is controlled by means of a pressure difference which acts on its ends. This pressure difference is adjusted with the aid of the hydraulic lines 213 and 214; in a manner which corresponds to the production of the pressure difference by means of the lines 28 and 29. Furthermore, the body 211 carries, on its periphery, shut-off elements 215 with a control element 216 between them. As a result of movement of the body 211, the shut-off elements 215 expose one of the inlet openings 217, 218, whilst at the same time one of the other inlet openings 217, 218 is closed. The inlet openings 217 are joined to a line 219 in which the pressure generated by the pump 38 prevails. The inlet openings 218 are joined to the line 220, in which a pressure prevails which differs appreciably from the pressure which prevails in the line 219 (is lower in this embodiment). In principle, in the illustrative embodiment shown, the line 220 is unpressurised since the line opens into the oil reservoir 42. Consequently, as a result of movement of the body 211, a pressure difference will be created over the control element 216, so that a force is generated which is opposed to the force generated on the body 211 as a consequence of the pressure difference from the lines 213 and 214. Consequently, the body 211 will in each case assume an equilibrium position depending on the pressure difference generated by the lines 213, 214 and, respectively, 219, 220. By changing the ratio of the surface area of the ends 221 of the body 211 to the surface area 222 of the control element 216 it is possible, assuming a single common pressure source (the pump 38 and the pressure accumulator 39), to set the degree of displacement of the body 211 to its equilibrium position. By this means the degree of opening of the inlet 217 and of closing of the inlet 218, and vice versa, can be controlled. Because the chambers on either side of the control element 216 are connected via respective lines 223, 224 to the chambers on either side of the piston element 225 of the element 200, a force will consequently be produced on piston element 225 from the pressure difference over the end faces 221 and, consequently, piston element 225 will likewise assume an equilibrium position from the pressure differences over the end faces of the body 211 and over the control element 216. The pressure difference over the end faces 221 of the body 211 is controlled from the steering force/steering torque to be generated, by means of which the degree of tilting of the tiltable section 9 of the vehicle 1 is likewise controlled.

If the right-hand wheel 2 in FIG. 11 now encounters, for example, unevenness in the road surface and as a result is briefly subjected to an upward force in the drawing, the element 225 in FIG. 13 will initially be subjected to a force directed towards the left in the drawing. Consequently, the pressure in the line 224 increases, as a result of which a different pressure difference over the control element 216 is set up. If the pressure difference over the end faces 221 of the body 211 remains unchanged, body 211 will consequently move in its longitudinal direction towards a new equilibrium position. In this way the counter-torque can be continually maintained by means of the element 200 during a tilt movement of the tiltable section 9 of the vehicle 1, whilst, at the same time, the wheels 2 are allowed to follow irregularities in the road surface 226 by means of the resilient and damping action of the suspension 203.

By way of example, the action of the element 210 can be described as follows: when a steering torque is exerted on the steering wheel 6 in order to steer the vehicle 1 into a bend, a pressure difference will be created between the lines 213 and 214 by the steering torque meter 7. Consequently, the body 211 moves from its neutral mid position, in which both inlets 217 are closed, for example to the right in the drawing. During this movement, the left-hand inlet 217 in the drawing remains closed, whilst the right-hand inlet 217 in the drawing is opened. At the same time, the left-hand inlet 218 in the drawing remains open, whilst the right-hand inlet 218 in the drawing is closed. Consequently, the pressure acting on the right-hand side of the control element 216 will increase, so that the movement of the body 211 to the right is counteracted. The further the body 211 moves to the right in the drawing, the further the right-hand inlet 217 in the drawing is opened and, at the same time, the right-hand inlet 218 in the drawing is closed, and, as a result, the greater will be the counteracting pressure on the right-hand side of the control element 216. As a result, the body 211 will reach an equilibrium position. Because the pressure difference which prevails over the control element 216 is simultaneously prevailing over the piston element 225, the counter-torque which (largely) neutralizes the effect of the reaction torque on the suspension 203 generated by the tilt mechanism on section 10 will be generated at the same point in time by means of the element 200. As a result of tilting the tiltable section 9 of the vehicle 1, the steering torque to be exerted on the steering wheel 6 will gradually decrease. At the same time as the tilt movement (22; 28, 29) decreases, the pressure difference over the body 211, generated by the lines 213 and 214, will also gradually decrease, so that the body 211 moves back towards the left in the drawing into its neutral position, and the counter-torque generated by the element 200 therefore also decreases proportionally.

Of course, other methods are also conceivable for generating a counter-torque which, for example, is of the same magnitude as, but in the opposing direction to, the reaction torque to be generated by the non-tilting section 10 of the vehicle 1 from the torque caused by the drive 22 of the tilt mechanism for tilting the tiltable section 9 of the vehicle 1. For example, the control element 210 can be replaced by an electrical equivalent. Preferably, with this arrangement provision is made for the wheels on the non-tilting section 10 to be able to continue to follow irregularities in the road surface 226 unchanged, even when the counter-torque is prevailing. To this end, it is preferable to construct the drive for the generation of the counter-torque in such a way that compression and relaxation of the wheels 2 on the non-tilting section 10 remains possible.

The element 210 is not exclusively used for vehicles which have a tilting section 9. Use in conventional vehicles without a tilt mechanism is also conceivable, for example in order to generate a counter-torque when taking a bend in order to keep the vehicle level instead of said vehicle tilting towards the outside of the bend, as is customary in the case of three- or multi-wheeled vehicles, whilst in this case as well the compression and relaxation of the individual wheels remains possible without restricting their individual suspension. Of course, further variants of the embodiment shown in FIGS. 11–13 are conceivable. For example, the single piston/cylinder assembly 200, by means of which the arms 201 are jointly driven, can be replaced by, for example, two piston/cylinder assemblies, which then are each connected on one side to the non-tilting section 10 and on the other side to one respective arm 201, in order to control the arms 201 individually. FIGS. 11–13 show how the drive rod 230 extends through the two end walls 231 of the cylinder of the piston/cylinder assembly 200. Consequently, the piston element 225 has identical surface areas for each of its faces. It will be clear to those skilled in the art that other designs can also be chosen. A desired torque can also be generated by means of a rotary element, instead of by piston/cylinder assemblies (so-called linear actuators).

A force can also be exerted on the body 211 by, for example, mechanical or electromagnetic means instead of by means of a pressure difference. A mechanical method can be, for example, by means of a draw/compression spring. It is advantageous if the movement of the body 211 is controlled on the basis of force rather than displacement.

We claim:

1. Vehicle (1) with at least three wheels (2,3) resting on the ground, at least two of which wheels (2) are arranged on either side of the center of gravity with respect to the longitudinal axis of the vehicle, and at least one of which wheels (3) is directionally controllable, and wherein at least one section (9) of the vehicle is tiltable about the longitudinal axis of the vehicle for the purpose of producing and/or maintaining a change in direction of the directionally controllable wheel (3) during travel, a control element (6) for controlling the at least one directionally controllable wheel (3), and a power-assisted tilt element (22,22') for tilting said vehicle section about the longitudinal axis of the vehicle, wherein the vehicle is self-balancing and comprises a sensor (7) connected to the directionally controllable wheel (3) for registering the magnitude and the direction of the load which is to be applied to the directionally controllable wheel (3) for the purpose of producing and/or maintaining a change in direction thereof during travel, the sensor (7) being connected to the tilt element (22,22') to produce a tilt as a function of the registration by the sensor.

2. Vehicle (1) according to claim 1, wherein the sensor (7) comprises a twistable element (32,34) which connects the control element (6) and the directionally controllable wheel (3) to one another, the degree and direction of twist of twistable element (32,34) being a measure for the magnitude and direction of the load on the directionally controllable wheel (3).

3. Vehicle (1) according to claim 1, wherein the at least one directionally controllable wheel (3) is able to tilt with the tiltable section (9) of the vehicle.

4. Vehicle (1) according to claim 1, wherein the directionally controllable wheel (3) has a castor.

5. Vehicle (1) according to claim 1, wherein the control element (6) comprises a conventional steering wheel or steering bar rotatable about a steering column.

6. Vehicle (1) according to claim 1, wherein the control element (6) can be moved from a neutral position thereof, which corresponds to the vehicle travelling in a straight line, against the action of a restoring force which is generated by the power-assisted tilt element (22,22').

7. Vehicle according to claim 2, wherein the twistable element (32,34) is provided at the periphery with first and second connecting elements (35,35',36,36') which run in the peripheral direction and are arranged some distance part, wherein the first connecting element (35,35') runs over a greater distance in the peripheral direction than does the second connecting element (36,36') and wherein first and second actuating contacts and a short-circuit contact are arranged in mutually fixed positions around the twistable element, which twistable element is rotatable about its longitudinal axis with respect to said contacts (37), or vice versa, and wherein said contacts (37) and said connecting elements (35,35',36,36') are so arranged that the second connecting element (38,35') can be brought into contact with the short-circuit contact and either the first or the second actuating contact, the first connecting element (35,35') can be brought into contact with both the first and the second actuating contact and, when the first connecting element is in contact with both the first and the second actuating contact, the second connecting element (36,36') is connected solely to the short-circuit contact.

8. Vehicle (1) according to claim 1, wherein the functioning of the sensor (7) is dependent on the speed of the vehicle.

9. Vehicle (1) according to claim 1, wherein a further sensor for measuring the load, for producing a change in direction of the directionally controllable wheel (3), is accommodated between the control element (6) and the directionally controllable wheel (3), which sensor is connected to a power-assisted drive element for reducing the requisite control load to be produced by the control element (6), wherein the effect of said second sensor optionally increases as the vehicle speed decreases.

10. Vehicle (1) according to claim 1, wherein the vehicle section (9) is tiltable about the longitudinal axis via the action of two drive elements (22,22') connected to one another, which drive elements both assume a limit position when the vehicle section (9) is in a neutral position and can be brought into the other respective limit position for respective tilting of the vehicle section (9) in the one or in the other direction.

11. Vehicle (1) according to claim 10, wherein two cylinder/piston (22,22') assemblies maintain a fixed mutual spacing at one end, whilst the other ends of the respective cylinder/piston assemblies are connected, some distance away from the tilt axis of the vehicle section, to the tiltable vehicle section (9) and, respectively, the other vehicle section (10), and the cylinder/piston assemblies are of the double-acting type.

12. Vehicle (1) according to claim 1, wherein the driven wheels (2) are connected on a common axis of rotation via a differential.

13. Vehicle (1) according to claim 1, wherein a position sensor is fitted, which is incorporated in a control circuit for determining the steering force to be exerted on the steering wheel as a function of the movement of the steering wheel and/or determining the tilt speed or the righting speed as a function of the radius of the bend.

14. Vehicle (1) according to claim 1, wherein the tiltable section (9) of said vehicle is guided in a direction essentially perpendicular to the lengthwise direction of the vehicle with respect to a substantially straight guide path (114), the position of said guide path being adjustable about an axis essentially parallel to the longitudinal axis of the vehicle.

15. Vehicle according to claim 1, wherein the guide path is a slit (114) in a rotary element (113) which is rotatable about an axis essentially parallel to the longitudinal axis of the vehicle (101) with respect to the non-tiltable part of the vehicle.

16. Vehicle according to claim 15, with wheel hub steering, wherein the rotary element (113) is rotatable with respect to a front (107) and a rear (106) steering rod and a further guide path (112) is present some distance away from the rotary element (113), seen in the lengthwise direction of the vehicle (101), which further guide path is essentially vertical to the first guide path (114) in the neutral, non-tilted position of the vehicle (101), and along which further guide path (112) the frame (111) is guided.

17. Vehicle according to claim 1, wherein means are provided for generating a counter-torque, acting on the non-tilting section (10) of the vehicle (1), which counter-torque is applied in the opposite direction to, and is preferably of essentially the same magnitude as, the reaction torque generated by the non-tilting section (10) from the torque generated by the tilt mechanism to achieve a tilt movement of the tiltable section (9) of the vehicle (1).

18. Vehicle according to claim 17, further comprises a controlled drive element (200) for engaging on the wheels (2) of the non-tilting section (10) of the vehicle (1) and likewise connected to the non-tilting section (10) for generating a force which attempts to tilt the non-tilting section (10) with respect to the wheels (2).

19. Vehicle according to claim 17 further comprising an element (211) for arbitrary engaging or disengaging respective ports (217, 218), which element (211) has a first element (221) and a second element (222), with a first signal, proportional to the steering torque exerted on the steering wheel (6), acting on the first element (221), whilst a second signal acts on the second element (222) depending on the position of the ports (217, 218), which signals determine an equilibrium position of the element (211), and the signals acting on the second element (222) also act on the drive (200) to generate the counter-torque.

20. A vehicle comprising:
at least three wheels, at least two of the wheels being arranged on either side of a longitudinal axis of the vehicle and at least one of the wheels being directionally controllable;
one section of the vehicle being tiltable about the longitudinal axis for producing or maintaining a change in direction of the directionally controllable wheel during vehicle travel;
a control element for controlling the directionally controllable wheel;
a power assisted tilt element comprising two drive elements connected to one another, one of said drive elements being operably connected to said one tiltable section, both said drive elements assuming a first limit position when said one tiltable section is in a neutral position, said drive elements respectively assuming a second limit position for tilting said one tiltable section in one direction or an opposite direction; and
a sensor connected to the directionally controllable wheel for registering a magnitude and direction of a load that is applied to the directionally controllable wheel, said sensor being connected to said drive elements to produce a tilt as a function of the registration sensed by said sensor.

* * * * *